Sept. 1, 1970  J. F. G. M. L. CHARPENTIER  3,526,148
MECHANICAL TRANSMISSION
Filed Jan. 15, 1968  10 Sheets-Sheet 5
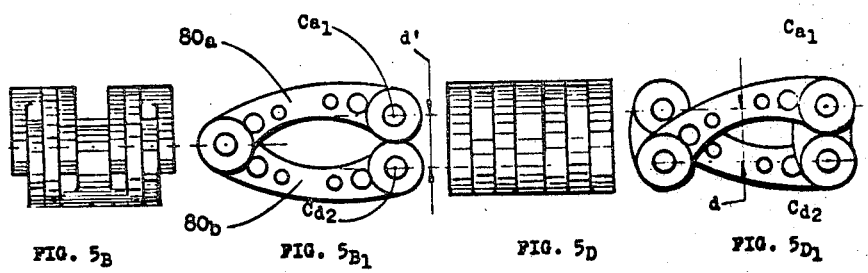
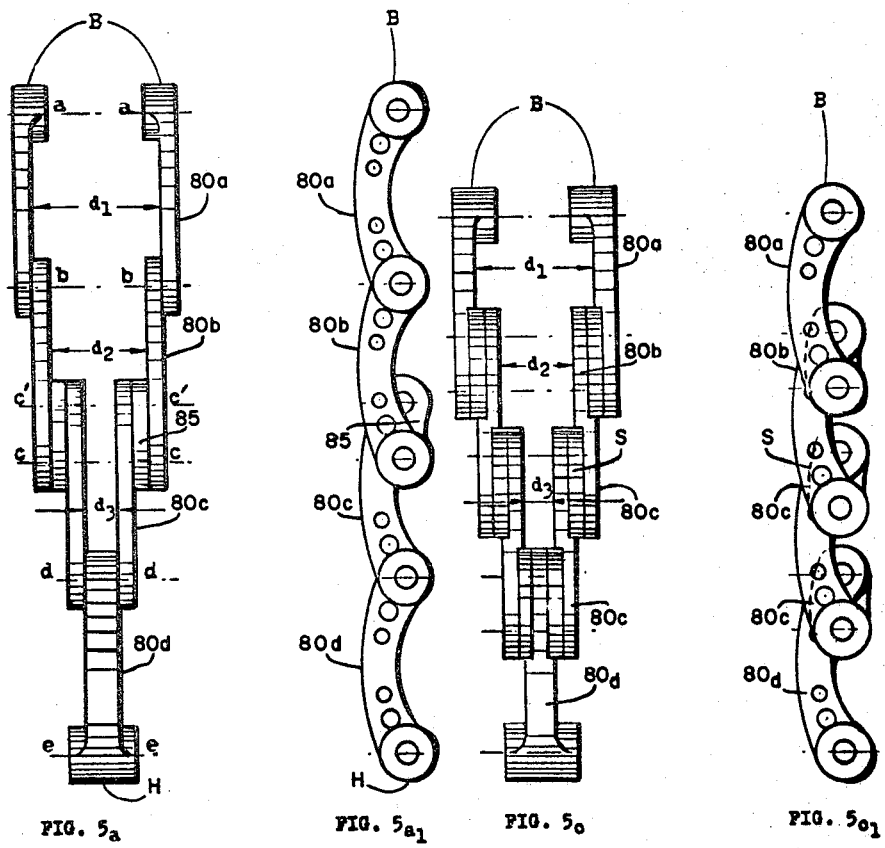
INVENTOR
JEAN F.G.M.L. CHARPENTIER
BY *Oldham & Oldham*
ATTORNEYS

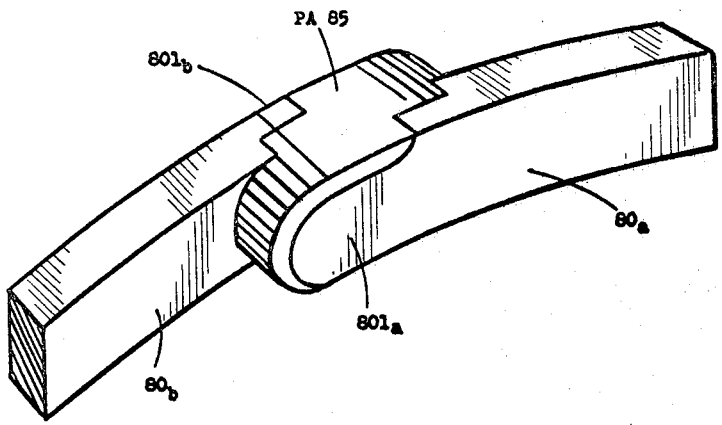
FIG. 6_A
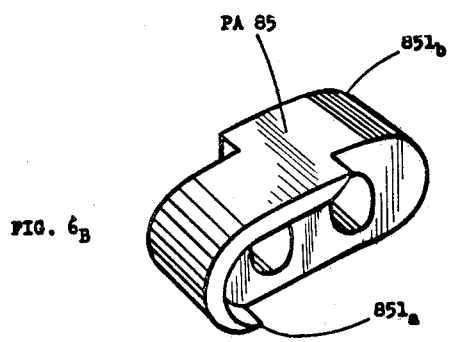
FIG. 6_B
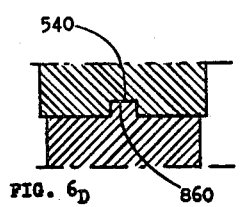
FIG. 6_D
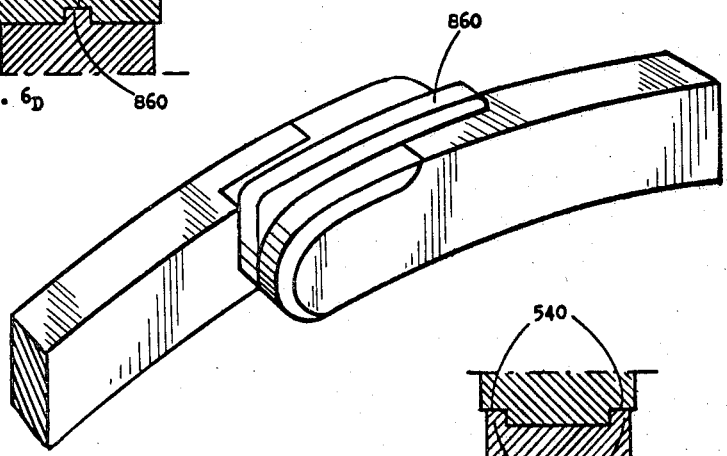
FIG. 6_C
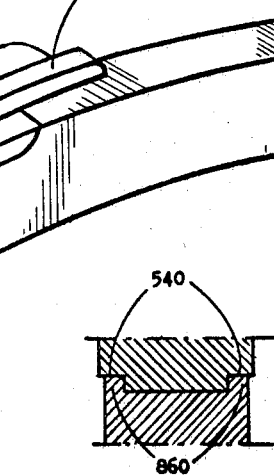
FIG. 6_E

INVENTOR
JEAN F. G. M. L. CHARPENTIER

BY Oldham & Oldham
ATTORNEYS

United States Patent Office 3,526,148
Patented Sept. 1, 1970

3,526,148
MECHANICAL TRANSMISSION
Jean F. G. M. L. Charpentier, 254 N. Highland,
Akron, Ohio 44303
Filed Jan. 15, 1968, Ser. No. 697,788
Int. Cl. F16h 33/04
U.S. Cl. 74—114                              7 Claims

ABSTRACT OF THE DISCLOSURE

The mechanical improvement constitutes a driving shaft, coaxial rotors and coaxial driven shaft. One-way clutches and oscillators between the rotors and driven shafts effect direct transmission to the driven shaft from the driving shaft. Preferably the actuators are transversely disposed side-by-side and coaxially mounted in respect to the driven shaft and cooperate with the one-way clutches. A one-to-one drive ratio can be achieved.

---

The specific operational conditions of the converter's mechanism are listed as follows:

(A) To maintain in neutral position the converting mechanism, when engaged, as long as the engine is idling, so that no motion is transmitted to the driven shaft.

(B) To achieve in a manner imperceptible to the human senses, as well as to the mechanical components themselves, their locking action which happens as soon as the absolute magnitude of both nominal driving torque and resisting torque becomes identical, from which the motion of the driving shaft is transmitted in direct drive to the driven shaft.

(C) To perform between the extreme cases A and B a continuous conversion of the driving motion, to instantaneously and permanently maintain the absolute magnitude of the converted driving torque identical to that of the resisting torque.

(D) To instantaneously but smoothly transmit to the driven shaft the maximum power the engine develops.

(E) To operate at low drive ratio with a high efficiency which should be never lower than 90%, while close to unity in direct drive.

The operational principles of the converter are as follows:

(A) When the absolute magnitude of both driving and resisting torque become identical, the angular velocity of their respective driving and driven shafts also become identical through the action of the converting mechanism. As soon as such an identity is achieved the reaction on the fulcrum member vanishes so that a small force is only required to carry it in the general one to one drive rotational motion ratio. The internal resistance is eliminated as the required force is transmitted by the head of the actuator which turns around the driven shaft coming to push through normal contact the rear face of the fulcrum member which turns in performing the locking of the components transmitting then the rotary motion of the driving shaft in direct drive to the driven shaft.

(B) When the state of direct drive equilibrium as above defined the absolute magnitude of the resisting torque increases relatively to that of the driving torque, both shafts remain connected while their angular velocity decreases till reaching that one corresponding to a selected maximum magnitude of the driving torque. At this point the lock performed between both driving and driven shafts disrupts, allowing the converting mechanism to return under load in operation. The angular velocity, $\omega_{DG}$, of the driving shaft remains constant and equal to that corresponding to the maximum driving torque, $T_{D\ max}$. As the magnitude of the resisting torque $T_R$ continue to increase, the angular velocity of the driven shaft, $\omega_{DN}$, continues to decrease in such a manner that is satisfied the hyperbolic power equation:

$$Pp = (T_{D\ max})(\omega_{DG})p = (T_R)(\omega_{DN}) = C^t$$

where the sign $p$ holds for the efficiency coefficient. In the case the driving shaft receives the motion from a gasoline engine, there is an infinity of power equations corresponding to the different opening angles of the carburetor choke-throttle. The mechanism of conversion is able to satisfy the infinity of power equations comprised with the practical range of the angular opening of the carburetor choke-throttle.

(C) When, from any state of equilibrium corresponding to the case described in the Paragraph B above, the absolute magnitude of the resisting torque $T_R$ decreases from a value greater than that of the driving torque $T_D$, the angular velocity $\omega_{DN}$ of the driven shaft increases. This velocity $\omega_{DN}$ increases because as the transmitted torque decreases the converting mechanism restitutes the received power by increasing in a compensating manner the amplitude $\lambda$ of the oscillator's motion.

In the drawings:

FIGS. 5A to 5C illustrate two examples of the actuators, which are substituted to the oscillators of the former concept, and are shown in retracted and extended position for comparing the corresponding elongations;

FIGS. 6A to 6E illustrate the detail of the articulation connecting the elements of the actuators, as shown in FIG. 4;

Figure 1:
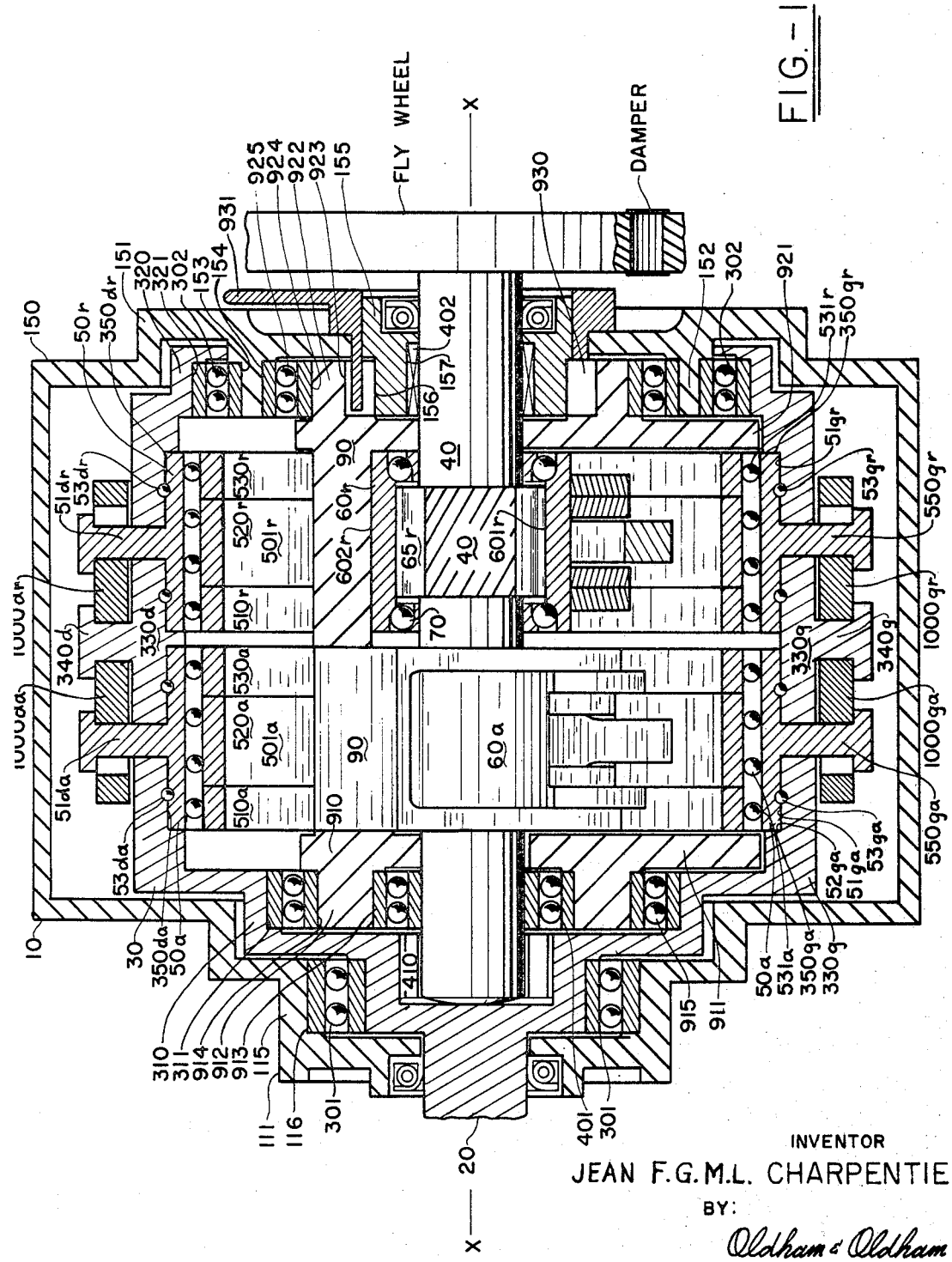
FIG. 1 is a horizontal cross sectional view, taken on trace HH in respect to FIG. 2, and passing by the general rotational axis of a converter which incorporates the improved elements of the invention.

On the drawings, the numeral 10 denotes a casing for the converter, inside the casing a rotor 30 is keyed to or integral with an input shaft 20 which is connected in a manner not shown with a prime mover, such as for instance an electric motor, a gasoline or diesel engine. The positive sense of rotation of the driving shaft 20 is indicated by an arrow in the figures illustrating the transverse cross sections. The rotor 30 is journalled for rotary motion on both transverse flanges of the casing 10 by means of the roller bearings 301 on the input side and 302 on the output side, and so is the driving shaft 20 as being integral to the rotor 30.

A driven shaft 40 is mounted in alignment with the driving shaft 20 on the central rotational axis XX and is journalled for rotary motion on the input side in the rotor 30 by means of the roller bearing 401 and indirectly journalled on the casing 10 by the relays of the roller bearings 915 and 301, and is directly journalled on the rear flange 150 of the casing 10 on the output side by means of the needle bearing 402.

Figure 2:
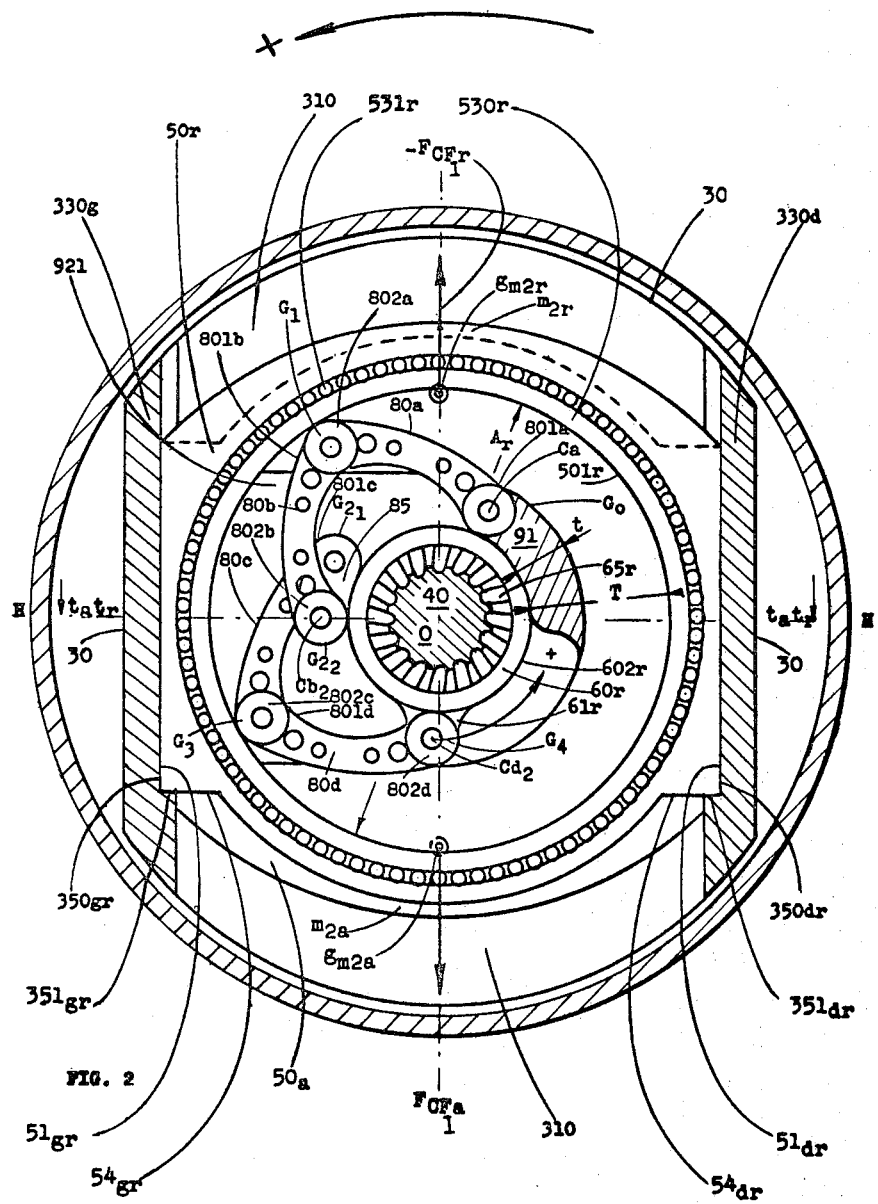
FIG. 2 is a transverse cross sectional view taken on line TT of FIG. 1 which illustrates the converting mechanism at rest in neutral position.
Figure 3:
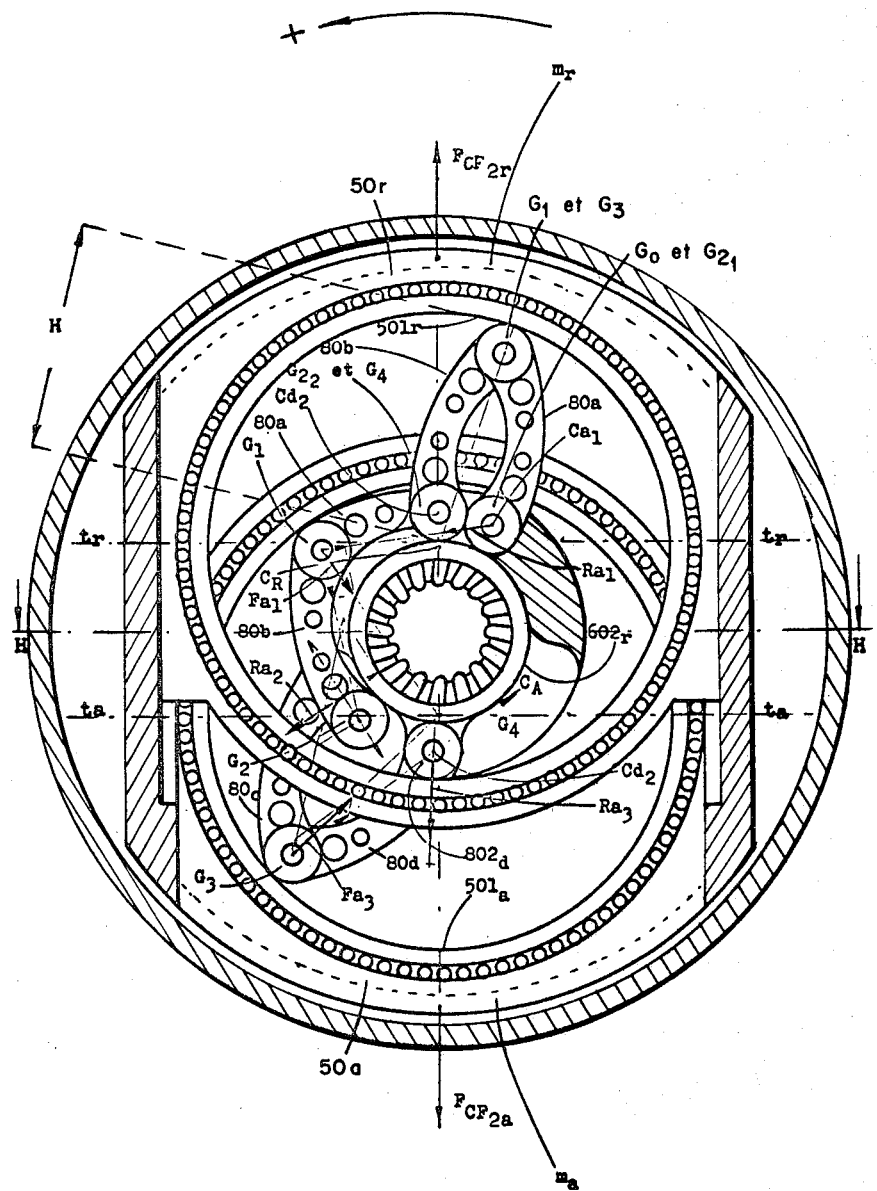
FIG. 3 is a transverse cross sectional view also taken on line TT of FIG. 1 illustrating one of the infinite number of configurations the converting mechanism performs when the actuators oscillate at maximum amplitude.

The structure of the rotor 30 comprises a pair of symmetrical longitudinal walls 330d and 330g, FIGS. 1, 2, and 3. In their inner face each wall has a pair of grooves; the wall 330d has the groove 350da on the input side of the rotor and the groove 350dr on the output side; the wall 330g has on the corresponding sides the grooves 350ga and 350 gr. The planes of the grooves are all parallel. Each pair of both right and left sides corresponding grooves are symmetrically disposed so that the grooves 350da and 350ga are facing each other, and that so are doing the grooves 350dr and 350gr. As shown in FIG. 2, the pair of rear grooves 350dr and 350gr (output side) start from the shoulders 351dr and 351gr located at a definite distance of the external contour of the rotor 30 on the lower side, and are fully extended on the opposite upper side of the external contour of the rotor where they are opened. The grooves 350da and 350ga constituting the frontal pair are only shown in FIG. 1 illustrating the horizontal cut HH of FIG. 2. They are identical in shape to the rear ones but oriented in the opposite direction as corresponding to a 180° half a turn rotary motion. Each pair of facing grooves constitutes a sliding guide in which is mounted a mobile component, 50a in the frontal guide and 50r in the rear guide. Both mobile components 50a and 50r are identical in shape but mounted, as corresponding to their guide, in two opposite directions. Both mobile components 50a and 50r have an active area constituted by the internal cylindrical surface of a bore, respectively 501a and 501r, which may have any adequate contour, shown as circumferential in the present example. The transverse section of these mobile components, shown in FIG. 1, is inscribed inside the contour of their corresponding sliding guide. Each one comprises two longitudinal walls parallel to the central axis XX, the external of which are parallel one to the other like: 51da and 51ga for the frontal one and 51dr and 51gr for the rear one. To minimize the magnitude of the resistance opposed to the displacement of the mobile components, 50a and 50r relative to their sliding guides and securing them with a constant perfect alignment, a four point contact ball bearing like: 53da and 53ga; 53dr and 53gr, as described and illustrated in the U.S. Pat. No. 3,013,446, can be interposed between the sliding surfaces of the mobile components 50a and 50r, and their adjacent guiding surfaces respectively: 350da and 350ga; 350dr and 350gr. The internal effective diameter Ar of the rear mobile component bore 501r, shown in FIGS. 1, 2, and 3, is referred to the internal diameter of a series of cylindrical sleeves: 510r, 520r, 530r, which are mounted free to rotate inside a larger bore machined in the mobile component 50r, by means of the ball 531a and 531r, FIG. 1, and 531r, FIG. 2. This mountage enables the sleeves of the series to be carried by the rotating mobile components with zero angular displacement, so that the velocity of their active area relative to the corresponding contacting surfaces of the actuators (further described) which slide upon them is reduced to that of their own oscillating motion which tends towards zero when the load tends towards infinity. The presence of the sleeves is not obligatorily required. They can be reduced to two or one per mobile component, and the bores can be as well as directly machined at the proper caliber in the mobile components to be directly used as the active areas. In FIG. 2, both the frontal and rear mobile components bores, which are referred 501a and 501r in FIG. 1, have their geometrical axis both aligned on the central longitudinal axis XX, they are therefore co-axial with the driven shaft 40. This configuration corresponds to the neutral position of the converting mechanism. The base of each mobile component 50a and 50r comprises two symmetrical transverse areas 54dr and 54gr shown on the rear one 50r in FIGS. 2 and 3. In neutral position these area take support on the corresponding shoulders: 351dr and 351gr which are constituted by the origin of each one of the grooves, respectively 350dr and 350gr on the walls 330d and 330g of the rotor 30.

On both right and left longitudinal walls 330d and 330g of the rotor 30, at the area center is secured a pivot 340d and 340g shown in FIG. 1, coming out of the outer side. Shown in FIG. 8, for the left outer side, a straight lever 1000g composed of two aligned arms: 1000ga and 1000gr is pivotally mounted on the central pivot 340g and is extended at rest in horizontal position shown in dotted line. Both arms are symmetrical respectively to the geometrical axis of the pivot 340g. At both ends of the lever arms is machined an opening 1011ga and 1011gr with a contour elongated along the symmetrical axis direction. Each one of the mobile components has on both lateral sides an axle 551ga and 551gr outwardly extended first through the appropriate rotor walls openings 351ga and 351gr, and second through the openings 1011ga and 1011gr of the straight double lever arm 1000. On each one of the axles 551ga and 551gr is applied in opposite directions the even tension T of two identical springs Rga and Rgr which are pivotally mounted on the respective axles 360ga and 360gr, secured to the longitudinal wall 330g. The resting position of the lever 1000g, shown in dotted line in FIG. 8, corresponds to the neutral position of the converting mechanism. In this position the initial tension T of the springs Rga and Rgr passes at the distance $d$ from the geometrical axis of the pivot 340g and has respectively to said pivot 340g, a moment: $M_R = Td$. The right outer side of the rotor 30 is provided with a symmetrical mountage. So, the tensions on both pair of springs: Rda, Rga; and Rdr, Rgr, are added to maintain the mobile components 50a and 50r, in the neutral position shown in FIG. 2, by applying with a definite force the contacting area of their horizontal base, respectively: 54da and 54ga; 54dr and 54gr, on their supporting shoulders: 350da and 350ga; 350dr and 350gr.

Figure 8:
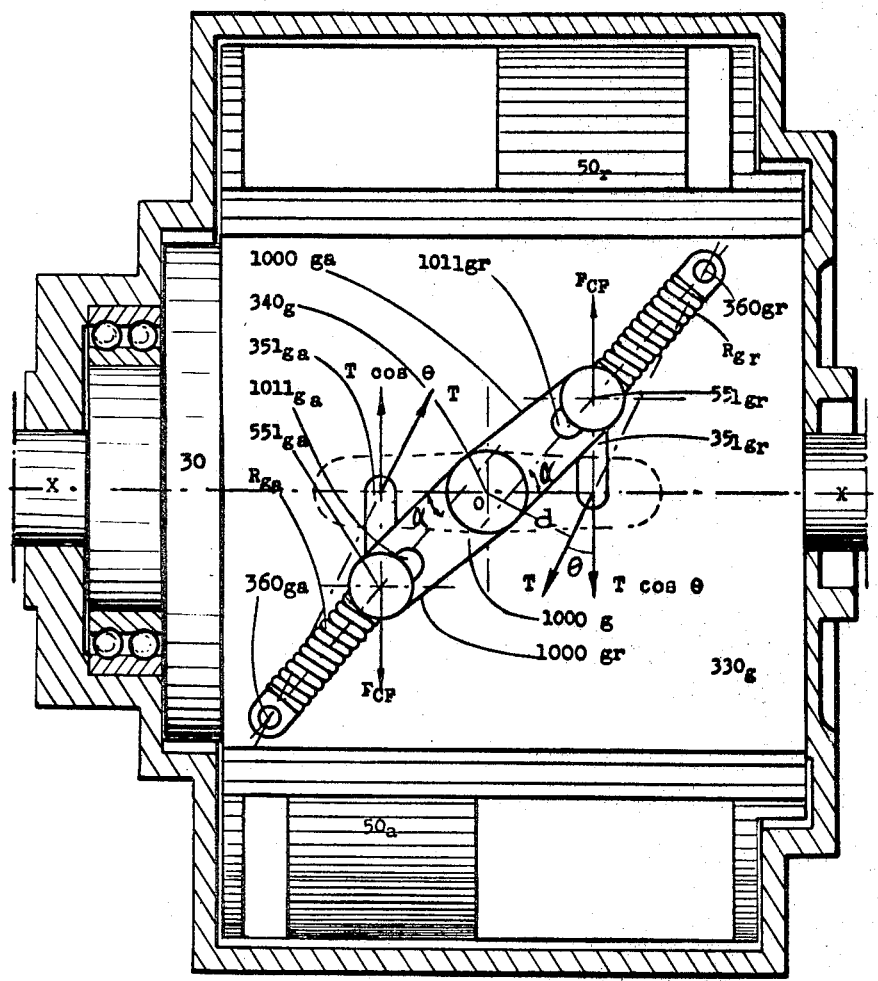
FIG. 8 illustrates a system for synchronizing and conjugating the displacement of the mobile components, while associated with resilient means for preventing the transmission of any rotary motion to the driven shaft as long as the driving motion is idling.

The mobile components 50a and 50r have a transversal axis, respectively $tata$ and $trtr$, which is determined by the transversal diameter of their bore: 501a and 501r. These transversal axes are normal to the planes of the longitudinal walls 330d and 330a. In neutral position both traversal axes $tata$ and $trtr$ are coinciding with the general transversal axis HH of the torque converter in the plane of the FIG. 2. They intersect therefore the central longitudinal rotational axis XX on the plane of the FIG. 2. The mobile components 50a and 50r are unsymmetrical in respect to their transversal axis $tata$ and $trtr$. It is therefore possible to consider the total mass M of each one as the resultant of two masses. As an example the total mass Mr of the mobile component 50r, FIG. 2, may be considered as the resultant of a first main mass $M_1$ whose center of gravity is located on the trace $o$ of the central rotational axis XX, and a second mass $M_2$ corresponding to the unsymmetrical material distribution of the shape. The unsymmetry of the mobile components shape is automatically illustrated by favour of their relative inverted position corresponding to the neutral configuration, as shown at the lower part of their contour, illustrated in FIG. 2, by the surface intercepted between the upper contour of the frontal mobile component 50a and the lower contour of the rear mobile component 50r. The same contour is shown in plain and dotted lines at the upper part of FIG. 2, where it determines the transversal section area of the additional mass $M_{2_r}$ whose center of gravity is located close to the top of the mobile component 50r. Through this combination, when an angular velocity is transmitted to the rotor 30, on each one of the secondary masses $M_{2a}$ and $M_{2r}$ of the mobile components 50a and 50r, a centrifugal force of same absolute magnitude: $F_{CF_a}$ and $-F_{CF_r}$, develops at their respective center of gravity: $GM_{2a}$ and $GM_{2r}$. The opposed signs of the centrifugal forces correspond to the "head against foot" mounted position of the mobile components 50a and 50r inside the rotor 30. Through the coupled action of both lateral synchronizing mechanisms as illustrated in FIG. 8, a perfect equi-partition of the centrifugal forces: $F_{CF_a}$ and $-F_{CF_r}$, and their antagonist retarding forces, respectively: $-Ta \cos \theta$ and $Tr \cos \theta$, on the corresponding mobile components 50a and 50r, is achieved through the relay of the lateral axles 551ga and 551gr, by the springs $Rg_a$ and $Rg_r$. Therefore, as long as the absolute magnitude of the centrifugal forces is smaller or equal to the vertical forces components of the spring forces the mobile components 50a and 50r remain seated in neutral position on their corresponding groove-shoulders, 351da and 351ga; 351dr and 351gr. The magnitude of the secondary masses $M_{2a}$ and $M_{2r}$ are assumed to be identical, as well as both the initial tensions $Ta$ and $Tr$, which are determined to satisfy this first condition in the idling r.p.m. range of the primary mover which acts the driving shaft 20. As soon as the absolute magnitude $|F_{CF}|$ of the centrifugal forces becomes greater than that of the opposed forces of the springs components $|T \cos \theta|$, to which is added that one of the resisting torque, the mobile components start to move away from one to another in performing two opposed outward, or radial displacements of identical elongation towards an equilibrium position.

The driven shaft 40 traverses the bores 501a and 501r of the mobile components 50a and 50r. The driven shaft 40 can be prevented from rotating faster than the driving shaft 20 by the interposition of an overrunning clutch 410, mounted between itself and the rotor 30 as in the example illustrated in FIG. 1, so that in case the driven shaft 40 becomes the mover it turns the driving shaft 20 or its rotary motion can be decelerated by the resistance opposed by the driving shaft 20. The overrunning clutch 410 can be releasable by means of any convenient process, like the one described in France Pat. 972,364 through a hand control device.

Two overrunning clutches 60a and 60r, FIG. 1, are mounted for oscillating motion around the driven shaft 40, with their sprags 65a and 65r interposed between an inner and outer race, or between the driven shaft 40 and outer races 60a and 60r, as in FIG. 1, with the roller bearings 70 mounted on both sides of each set of sprags, to accurately maintain the internal active surface of the outer race at the proper distance and position of the external active surface of the driven shaft 40. The overrunning clutches 60a and 60r are extended all along the portions of the driven shaft 40 corresponding to the width of the bores 501a and 501r of the mobiles components 50a and 50r. The external surfaces 602a and 602r of the outer races of the overrunning clutches 60a and 60r are machined in order to be used as active surfaces.

In this relative disposition the internal cylindrical surface of each bore 501a and 501r is facing the external cylindrical surface of its corresponding overrunning clutch, respectively 602a and 602r.

Within the range of the angular velocity variation extended from rest to idling condition, the mobile components 50a and 50r are maintained in lower or central position by the initial tension of the controlling springs, $Rda$, $Rdr$, $Rga$, $Rgr$, FIG. 8, so that the geometrical axis of the bores 501a and 501r are aligned in coincidence with the central rotational axis XX. Therefore, each pair of these facing surfaces are coaxially mounted and constitute the boundary surfaces of two concentric cylindrical annular spaces: respectively the frontal concentric annular space constituted by the surfaces 501a and 60a; and the rear concentric annular space constituted by the surfaces 501r and 60r, FIGS. 1, 2, and 4.

Both annular spaces are traversed by a longitudinal element 90, FIG. 1, which constitutes the active part of a component denoted "Fulcurm Member" and which is mounted for restricted rotary motion inside the rotor 30. The transversal section area 91 of the element 90 is, as illustrated in FIGS. 2, 3, and 4, a limited angular section area of an annulus whose thickness $t$ is a fraction of the annular space thickness $T$.

The longitudinal member 90 has on its front side (located on the input side), a transversal flange 910 with a counterweight 911 and an external hub 912. The bore 913 of the hub 912 receives the roller bearing 401 which supports for rotary motion the driven shaft 40. A roller bearing 915 is mounted between the external cylindrical surface 914 of the hub 912 and the internal cylindrical surface 311 of the rotor shoulder 310, so that the front side of the fulcrum member is directly supported either statically or rotationally by the rotor 30, and indirectly by the casing 10 through the relay of the rotor 30.

The longitudinal member 90 has on its rear side (on the output side) a transversal flange 920 with a counterweight 921 and an external hub 922 receiving on its external surface 924 the roller bearing 925 which is mounted inside the internal surface 154 of a first internal hub 152 integral with the flange 150 of the output side of the casing 10. So the fulcrum member is mounted on both ends for rotary motion. The internal cylindrical surface 923 of the fulcrum member hub 922 is connected to the external surface 156 of a second and smaller internal hub 155 of the flange 150 by means of the sprags 930 which prevent the fulcrum member 90 to rotate in the negative direction which is, by convention, opposed to that of the driving shaft. The sprags 930 can be mounted releasable by means of a hand control 931 acting as described in the French Pat. No. 972,364.

Figure 4:
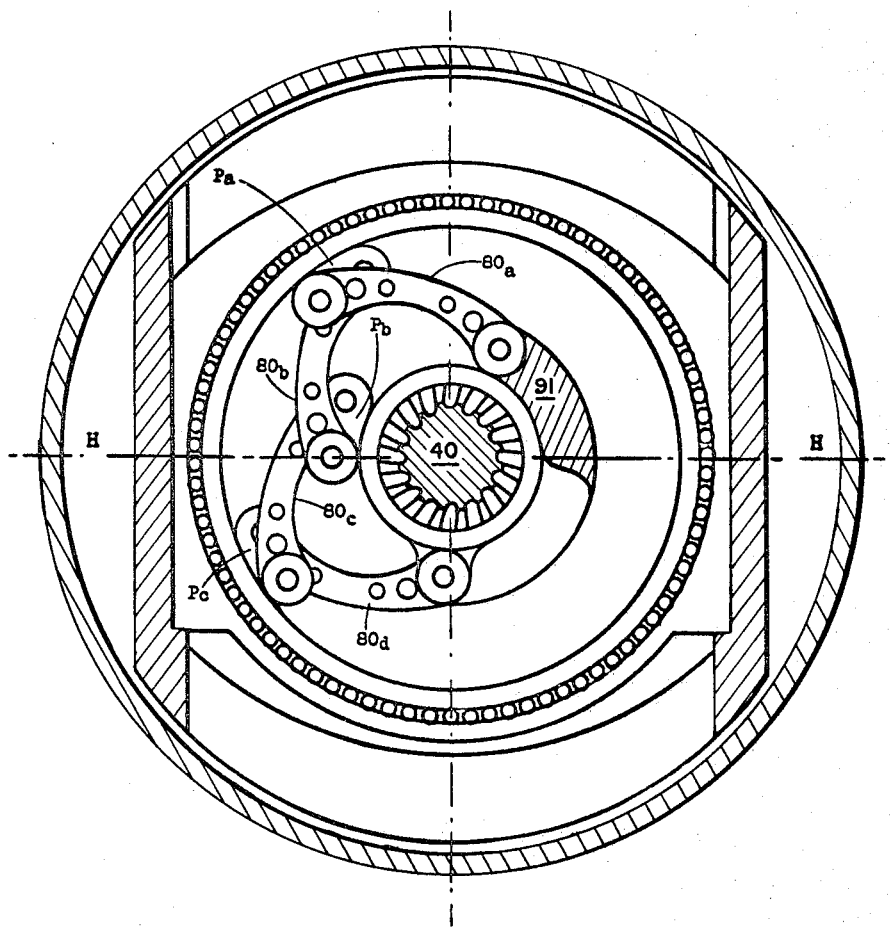
FIG. 4 illustrates the same mechanism as in FIGS. 2 and 3, with a different mode of connection between the elements constitutive of the actuators.
Figure 7:
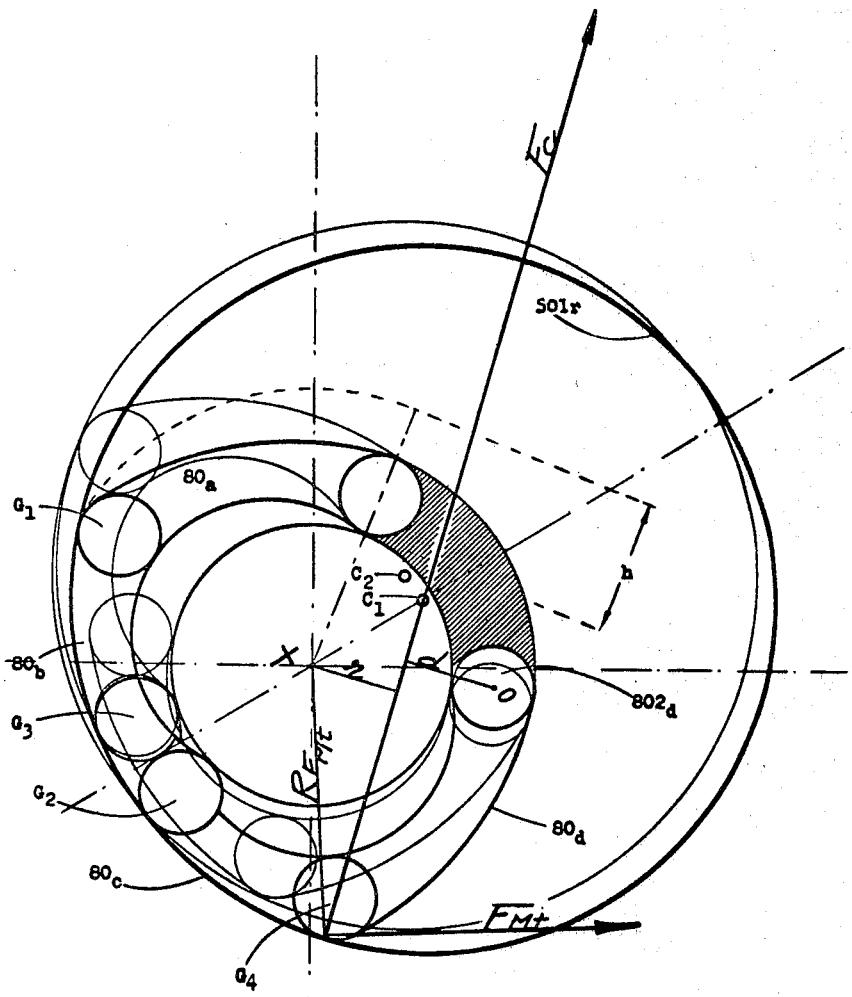
FIG. 7 illustrate one of the actuators in the fully extended position and in another immediate following position showing how it returns in backwards motion in the initial retracted position.

Inside each concentric annular space is mounted a flexible expandable-retractable actuator, shown in FIGS. 1, 2, and 4, in neutral configuration, and in FIG. 3 in operational configuration, the detailed concept of which are illustrated in the series of FIGS. 5 and 6.

In FIG. 5a is shown the projection of an actuator fully horizontally expanded, and in FIG. 5a the corresponding profile view of same. Each actuator is composed of successive elements and each element comprises a pair of arms like: 80a, 80b, 80c. The elements are articulated one after the other, they have preferentially, but not obligatorily, an identical profile form. The distance apart of the elements arms is maximum at the base B of the actuator, the pair 80a in the present examples, and is progressively decreasing as going towards the head H, so that the respective distances apart: $d_2$ and $d_3$, for the following pairs: 80b and 80c, satisfy the condition: $d_1 > d_2 > d_3$. The distance apart: $d_3$ of the element 80c corresponds to the thickness of the heading element 80d of the actuators. The distaice apart $d$ between the arms of each element is defined to achieve a complete retraction of all the elements of the actuator one into the other in a compact volume as illustrated in FIGS. 5B and 5B₁, so that after being folded in a zigzag process, they all disappear in coincidence as hidden behind the two external first ones 80a and 80b.

The base B of the actuators has an external quasi-cylindrical shape concentric to a central bore. The base B is mounted free to rotate on the left side of the fulcrum member 91. FIG. 2, from which the actuator expands in the positive direction. The base B is fixed at one side to the end of the torsion bar $Ca$, whose second end is tightened in the flange of the fulcrum member and develops an initial couple which tends to maintain the actuator in retracted position and develops a recalling couple to return the actuator from expanded to retracted position. The base B is externally guided and supported by the concave cylindrical surface $G_0$ made on the corresponding active left side of the fulcrum member 91 to provide a large bearing area to both contacting surfaces. The articulations of the actuator's elements are mounted in a zigzag manner inside the concentric annular space in order to be alternatively applied for taking support on each one of the boundary surfaces of said concentric annular space. As shown in FIG. 2 the lower articulations aa, cc, c'c' of FIG. 5a and ee are mounted for taking support on the external cylindrical surface $602_r$ of the outer race $60r$ of the one way clutch while the upper articulations bb and dd are taking support on the internal surface $501r$ of the corresponding sleeves of the mobile component $50r$. The bases of the elements 80b and 80c which are contacting the active external surface $602r$ of the one way clutch outer race $60r$, are connected by means of a small coupling arm 85 whose length corresponds to the distance apart in the retracted position of the actuator as shown at the top of the FIG. 4. The coupling 85 acts as a skate in providing a large area for sliding on said outer race active surface $602r$. The head 802 of the actuator is rotatably fixed to the outer race $60r$ of the one way clutch by means of the axle $Cd_2$ which connects the head $802d$ to the arm $61r$ of said outer race $60r$. The FIGS. 5c and $5c_1$, 5d and $5d_1$ are illustrating an actuator whose each articulation is mounted with a small arm or skate like 85, of FIGS. 5a, 5b, 5c, and 5d. The detail of that skate is shown in the series of the FIG. 6; the skate PA85 has a double hinge providing a large cylindrical concave surface $851_A$ to the ends 801a and 801b of the zigzagging arms 80a and 80b. The skate 85 may have a guide 860 sliding in a corresponding circular groove 540 made in its corresponding supporting sleeve as well as in the active surface of the one way clutch outer race $602r$.

Figure 9:
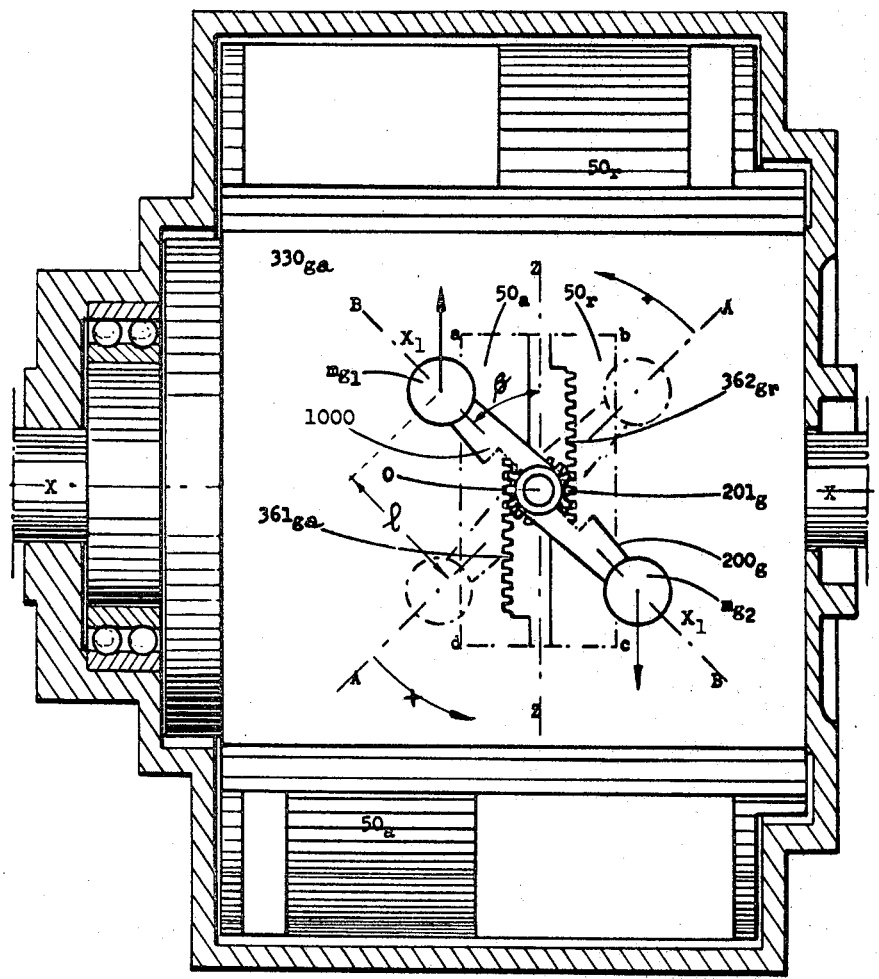
FIG. 9 illustrates a system for synchronizing and conjugating the displacement of the mobile components while associated with controlling means responsive to the centrifugal force.
Figure 10A:
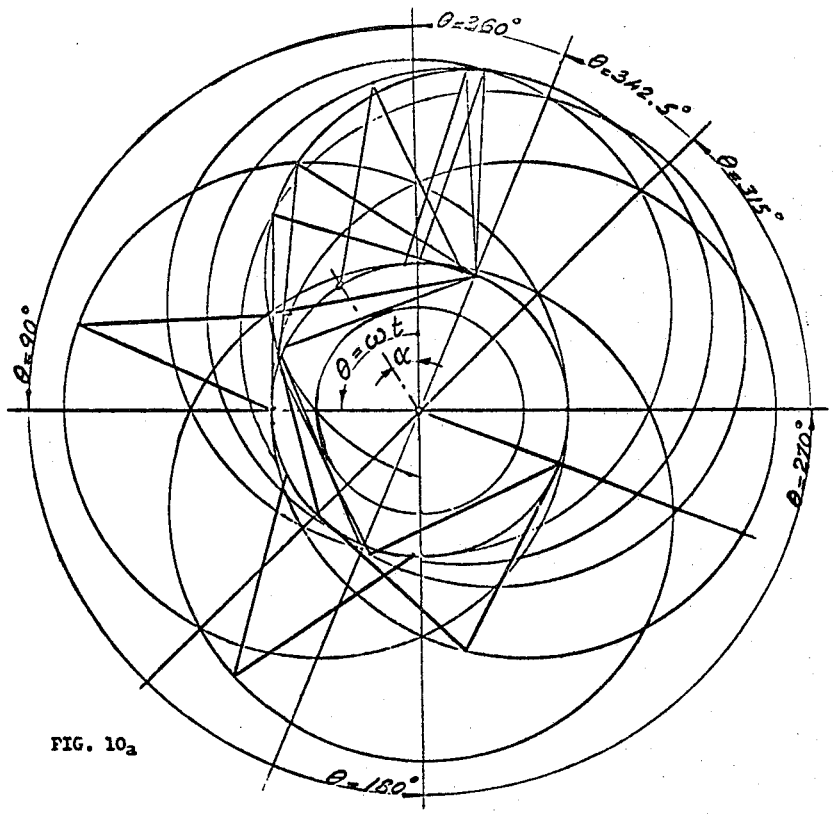
FIGS. 10A and 10B illustrate through a diagram and a functional curve the angular range in which the driving shaft achieves a 1 to 1 drive to the driver shaft through the action of the converting mechanism when the actuators operate at the maximum amplitude of their oscillating motion.
Figure 10B:
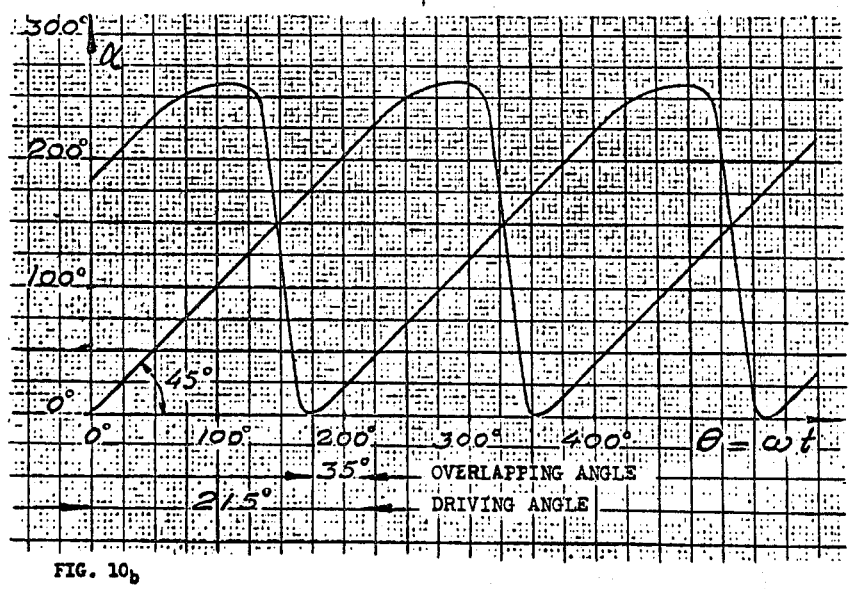

In FIG. 9 is illustrated, on the left side of the converter rotor 30 a second mode of synchronization of the mobile components displacement, comprising two identical and symmetrical devices mounted in a manner similar to that one illustrated in FIG. 8, on each external face of the longitudinal walls 330d and 330g of the rotor 30. Each device comprises a pinion gear 210g, mounted for rotary motion on the center area of the lateral wall.

The pinion 201g meshes with two racks $361_a$ and $361_r$ respectively machined on each one of the mobile components 50a and 50r which are then compelled to perform identical displacements in opposite direction. Integral with the pinion 201g, two identical masses $M_{g_1}$ and $M_{g_2}$ are mounted in a diametrically opposed manner on the straight lever 1000 so that under the rotary motion of the rotor 30 a central centrifugal force $F_{CF_c}$ is radially developed from the central axis XX on the masses $M_{g_1}$ and $M_{g_2}$.

This new central centrifugal force $F_{CF_c}$ has a tangential component denoted $F_{CF_3}$ as being a third active centrifugal force, the magnitude of which depends upon those of the masses $M_{g_1}$ and $M_{g_2}$ and of the angle at the center $\alpha$ not illustrated on the drawing, so that it is expressed as:

$$F_{CF_3} = (F_{CF \text{ CENTRAL}}) [f(\alpha)]$$

The moment of this force $F_{CF_3}$ relative to the center O of the lever arm 1000 acts the mobiles component 50a and 50r. This moment is proportional to the length $l$ of the arm of the lever 1000 and to the sine of the angle $\beta$ this arm forms with the direction ZZ normal to that of the central axis XX. This moment has the form:

$$M^t{}_oF_{CF_3} = (F_{CF \text{ CENTRAL}}) [f(\alpha)] \, l \sin \beta$$

It equals zero when the axis $X_eX_e$ of the lever 1000 is aligned with the direction ZZ. From this position when the lever 1000 rotates in the positive direction, as to come in the position BB shown in FIG. 9, the third centrifugal force $F_{CF_3}$ acts against the first and the second centrifugal forces: $F_{CF_1}$, on FIG. 2, and $F_{CF_2}$ on FIG. 3, as trying to inwardly move the mobile components 50a and 50r. If from the position ZZ the lever 1000 rotates in the negative direction as to come in the position AA shown in dotted lines in FIG. 9, which corresponds to the initial or idling position, the third centrifugal force $F_{CF_3}$ then acts with the first centrifugal force $F_{CF_1}$, to outwardly move the mobile components 50a and 50r.

The retaining springs Rga and Rgr shown in FIG. 8 are not shown in FIG. 9 in order to avoid drawing complications but they can be mounted symmetrically in respect to the pivot axis of the gear in any appropriate condition to combine their action to those of the combined centrifugal forces. Another possibility consists to eliminate the eccentric masses $M_2$ of the mobile components and substitute to them a mass $M_5$ fixed to a radial lever arm acting on the pinion 201g around an axial parallel to the central axis XX while the racks are transversally machined on the mobile components. Through these arrangements an infinite number of parameters is available by combining the masses: $M_1$ $m_2$, $m_3$, the lengths of the lever arms, the angular ranges of variation, the springs tensions, and their flexibility laws. It is therefore always possible to adapt the functional operating conditions of the present motion converter to any kind of motor characteristics.

The mechanism of the converter being so described, it operates as follows: At rest or idling the bores of the mobile components are co-axial with the central rotational axis XX so that the annular spaces are concentric as shown in FIGS. 1, 2, and 4. The rotation of the bores has no action on the actuators which both stay in the identical superposed position shown in FIGS. 2 and 4, while the bases of the mobile component are seated on the shoulder of their sliding guides by the action of the controlling springs shown in FIG. 8, which balance the centrifugal forces $F_{CF_a}$ and $F_{CF_r}$ developed on the masses $m_{2_a}$ and $m_{2_r}$. When the angular velocity of the driving shaft is increased above the idling one, the centrifugal forces overcome the spring action. In case no resistance is transmitted back from the driven shaft to the mobile components by the actuators, said mobile components perform an outward displacement and in doing so transforms the initial concentric annular space into an eccentric annular space. Then an alternative increasing and decreasing radial distance variation is performed continuously, between a maximum and minimum value, everywhere into the eccentric annular space during every half a turn of each mobile component, and between the minimum and maximum value during the complementary half a turn. In the half a turn comprised between the maximum and the minimum values of the radial distance, the boundary surfaces approach one to the other in flattening the actuator which in turn elongates. As the base of the actuator is fixed on the fulcrum member which resists to any thrust in the reverse direction, the elongation of the actuator is entirely performed by its head which carries in rotary motion in the positive direction the outer race of the one-way clutch and through it the driven shaft. The transmitted angular motion is proportional to the elongation of the actuator, the elongation is proporional to the eccentricity of the annular space, and the eccentricity is proportional to the combined centrifugal forces developed on the mobile components masses and the control masses, and reversely proportional to the resisting force opposed to the positive rotary motion by the driven shaft and which is transmitted back to the mobile components by the resistance the actuators oppose to the flattening action of the active boundary surface of the mobile component bore energized by the centrifugal forces. The converter given in example is equipped with two mobile components whose cycles are dephased of an angle $\phi = 180°$. But the actuators are retracting faster than elongating which is a very important specific property.

What is claimed is:
1. A transmission comprising:
   a casing,
   a driving shaft entering in the casing and mounted inside for rotary motion, a rotor associated with the driving shaft and aligned with it on the central rotational axis of the transmission, and mounted for rotary motion inside the casing, a driven shaft in alignment with the driving shaft mounted in journalled relation for rotary motion in the casing, fly wheel means and damper means mounted to the driven shaft, one way clutch means coaxially mounted on the driven shaft for clutching said driven shaft in the same positive rotationary direction as the driven shaft, and with an outer race having an active external cylindrical surface, at least one mobile component secured to the rotor comprising a housing, a bore in the housing, with the bore axis aligned at rest with the driven shaft; with said driven shaft engaged inside the bore; with the bore diameter greater than the external outer race diameter of the one way clutch means, and with the internal cylindrical surface of the bore facing the external active cylindrical surface of said one way clutch means outer race, for both forming an initial cylindrical concentrical annular space with said mobile component outwardly displaced by the centrifugal force at angular velocity of the driving shaft greater than idling, and with outward displacement transforming said initial cylindrical annular space into a cylindrical eccentrical annular space whose eccentricity is proportional to the mobile component outward displacement, and with means to counterbalance said mobile component outward displacement, a flexible expandable-retractable actuator means mounted into said annular space of the mobile component, irrespective of the mobile component rotary motion keeping a constant static configuration as long as the annular space remains concentric; but responding at the smallest excentricity of said annular space by alternatively elongating and shortening as the result of the periodic radial distance variation the boundary surfaces impose everywhere into their eccentric annular space; with the first end, comprising a base of said actuator articulated on a fixed hinge secured on one side of a fulcrum member carried by the rotor while the second end, comprising a mobile head of the actuator, is articulated on a hinge to the outer race of the one way clutch means for transmitting to the driven shaft the positive phases of the converted rotary motion whose amplitude is proportional to the eccentricity of said eccentric annular space, therefore proportional to the mobile component outward displacement, means to return said flexible expandable-retractable actuator from expanded to retracted position.

2. The combination defined in claim 1 wherein means are provided on the casing to be fixed on a fixed support.

3. The combination defined in claim 1 wherein are operating in association a plurality of units converting motion comprising:

a plurality of mobile bored components circumferentially and equi-angularly secured to the rotor, with all their bores axis aligned at rest with the driven shaft and with said driven shaft traversing all the bores and journalled for rotary motion on both the rotor and the fixed casing, with each bore being greater than, and mounted facing the outer race external cylindrical surface of its corresponding one way clutch means to form a plurality of initial cylindrical concentrical annular spaces;

with said mobile components outwardly displaceable by the centrifugal force, with synchronizing means to insure the simultaneity and the identity of the outward and inward displacements of all the mobile components for transforming the plurality of the initial cylindrical annular spaces into a corresponding plurality of variable but permanently identical eccentrical annular spaces whose eccentricity is proportional to the magnitude of the outward displacement, and for transmitting thereof to the driven shaft, through a corresponding plurality of actuators, their successive one-way rotary motion in overlapping relation, to effect on said driven shaft a resulting continuous one-way rotary motion thereof;

with a plurality of returning means corresponding to the plurality of the mobile bored components, to return each actuator from expanded to retracted position.

4. The combination defined in claim 3 wherein:

first resilient means for preventing respectively the mobile bored components to perform any outward displacement from rest to idling angular velocity of the driving shaft, said resilient means returning said mobile components from operational to neutral position as the angular velocity of the driving shaft is decreased from higher value to the idling one.

5. The combination defined in claim 4 wherein means are operatively connected to respectively said mobile components to generate a second centrifugal force contributing to the displacement of said mobile components.

6. The combination defined in claim 5 wherein a releasable one way clutch is mounted for connecting the driven shaft with the driving shaft, either directly or through the rotor, when the drive is reversely transmitted from the driven shaft to the driving shaft.

7. The combination defined in claim 6 with the fulcrum member respectively traversing the annular spaces and being journalled for rotary motion: at the input side in the rotor; and on the output side in the fixed casing; with a one-way releasable clutch means normally restraining the rotary motion of said fulcrum member to the same positive direction as that of the driving shaft, with counter-weight means to position the gravity center of said fulcrum on the general rotational axis, with fly wheel means to energize said fulcrum member when carried in rotation.

References Cited

UNITED STATES PATENTS

| | | | |
|---|---|---|---|
| 2,036,133 | 3/1936 | Goltsch | 74—114 |
| 2,135,274 | 11/1938 | Braden | 74—114 |

MILTON KAUFMAN, Primary Examiner